(12) United States Patent
Nix

(10) Patent No.: US 8,776,785 B2
(45) Date of Patent: Jul. 15, 2014

(54) SOLAR HALF PARABOLIC SHELL SMELTER WITH A HELIOSTAT ON A TURNTABLE

(76) Inventor: Martin E Nix, Seattle, WA (US)

(*) Notice: Subject to any disclaimer, the term of this patent is extended or adjusted under 35 U.S.C. 154(b) by 811 days.

(21) Appl. No.: 12/459,719

(22) Filed: Jul. 7, 2009

(65) Prior Publication Data

US 2011/0005515 A1 Jan. 13, 2011
US 2012/0037152 A9 Feb. 16, 2012

(51) Int. Cl.
F24J 2/16 (2006.01)
F24J 2/18 (2006.01)
F24J 2/10 (2006.01)
F24J 2/02 (2006.01)

(52) U.S. Cl.
CPC .. *F24J 2/10* (2013.01); *Y02B 40/18* (2013.01); *F24J 2/18* (2013.01); *F24J 2/02* (2013.01); *Y02E 10/40* (2013.01)
USPC ........... 126/686; 126/617; 126/619; 126/620; 126/681

(58) Field of Classification Search
USPC ......... 126/617, 618, 619, 620, 634, 656, 680, 126/681, 685, 686, 688, 689, 690, 696, 400
See application file for complete search history.

(56) References Cited

U.S. PATENT DOCUMENTS

| | | | | |
|---|---|---|---|---|
| 549,765 A * | 11/1895 | Calver | | 48/89 |
| 608,755 A * | 8/1898 | Cottle | | 136/206 |
| 683,088 A * | 9/1901 | Wideen | | 126/603 |
| 2,277,311 A * | 3/1942 | Freeman | | 126/640 |
| 3,118,437 A * | 1/1964 | Hunt | | 126/600 |
| 3,179,105 A * | 4/1965 | Falbel | | 126/618 |
| 3,407,122 A * | 10/1968 | Dickinson, III | | 202/83 |
| 3,815,574 A * | 6/1974 | Gaydos, Jr. | | 126/620 |
| 3,884,217 A * | 5/1975 | Wartes | | 126/571 |
| 3,996,919 A * | 12/1976 | Hepp | | 126/618 |
| 4,235,224 A * | 11/1980 | Yarwood et al. | | 126/684 |
| 4,246,888 A * | 1/1981 | Jarzenbeck, Sr. | | 126/620 |
| 4,265,224 A * | 5/1981 | Meyer | | 126/572 |
| 4,280,480 A * | 7/1981 | Raposo | | 126/620 |
| 4,280,482 A * | 7/1981 | Nilsson, Sr. | | 126/618 |
| 4,311,011 A * | 1/1982 | Lewis | | 60/641.15 |
| 4,365,618 A * | 12/1982 | Jones | | 126/576 |
| 4,384,569 A * | 5/1983 | Clearman et al. | | 126/617 |
| 4,397,152 A * | 8/1983 | Smith | | 60/641.15 |
| 4,422,434 A * | 12/1983 | Statz et al. | | 126/634 |
| 4,422,445 A * | 12/1983 | Pelley | | 126/625 |

(Continued)

OTHER PUBLICATIONS

U.S. Appl. No. 12/286,583, Nix.

(Continued)

*Primary Examiner* — Avinash Savani

(57) ABSTRACT

Invented is a solar smelter that also manufactures hot air or hot fluids. A curved parabolic-half-shell and curved-overhang focuses the sun's rays, sunlight, unto a crucible, which is buried into a thermal-mass, or the ground. Using a planar-reflector, or heliostat, the sunlight is reflected horizontally unto an interior reflective wall of the curved parabolic-half-shell and curved-overhang. Surrounding the crucible is a thermal-mass with embedded pipes, that manufacture hot and compress air, or heat a gas or fluid. On top of the thermal-mass is a clear transparent-and-insulating floor that captures any stray solar rays, sunlight, adding heat to the thermal-mass. At the foci of the parabolic-half-shell and curved-overhang is a crucible for melting rocks, sand, glass or metals, or processing chemicals.

1 Claim, 5 Drawing Sheets

(56) References Cited

U.S. PATENT DOCUMENTS

| | | | | |
|---|---|---|---|---|
| 4,432,344 | A | * | 2/1984 | Bennington et al. ........... 126/680 |
| 4,455,153 | A | * | 6/1984 | Jakahi ........................... 48/62 R |
| 4,706,651 | A | * | 11/1987 | Yudow ........................... 126/681 |
| 4,881,372 | A | * | 11/1989 | Naito ............................... 60/521 |
| 4,896,507 | A | * | 1/1990 | Hosford ........................ 60/641.8 |
| 5,058,675 | A | * | 10/1991 | Travis ......................... 166/272.3 |
| 5,113,845 | A | | 5/1992 | Nix |
| 5,308,187 | A | | 5/1994 | Nix |
| 5,488,801 | A | | 2/1996 | Nix |
| 5,529,054 | A | * | 6/1996 | Shoen ........................... 126/681 |
| 6,178,707 | B1 | * | 1/2001 | Bengtson ........................ 52/200 |
| 6,811,271 | B2 | * | 11/2004 | Hayakawa et al. ........... 359/846 |
| 6,953,038 | B1 | * | 10/2005 | Nohrig ........................... 126/694 |
| 7,337,843 | B2 | * | 3/2008 | Mecham et al. ............... 166/302 |
| 7,975,685 | B2 | * | 7/2011 | Zhao ............................. 126/683 |
| 2008/0131830 | A1 | | 6/2008 | Nix |
| 2010/0078012 | A1 | * | 4/2010 | Nix ............................... 126/686 |

OTHER PUBLICATIONS

U.S. Appl. No. 12/284,177, Nix.

* cited by examiner

SOLAR HALF PARABOLIC SHELL SMELTER WITH A HELIOSTAT ON A TURNTABLE

FIELD OF INVENTION

A system for melting rocks, sand, glass and metals and processing chemicals using solar-energy, and for a system of manufacturing hot gas, hot air, or hot fluid using solar energy is described.

PRIOR ART

The invented device improves upon existing art.

Nix (U.S. patent application Ser. No. 12/286,583. Filing date Sep. 30, 2008. Pub. No. 2010/0079012, Apr. 1, 2010) is titled 'Half Parabolic Dish Reflector with Planar Reflector Solar Smelter'. The invention uses a parabolic-half-shell to reflect the solar energy, sunlight, to a foci. Nix uses a fully rotating parabolic-half-shell, with an attached half circular tiltable planar-reflector. The invented device improves upon Nix by using a turntable with a heliostat. The advantage is the parabolic-half-shell can remain in a fixed South position (or North position in the Southern Hemisphere), without rotating. This improvement allows for the addition of a thermal-mass for storage of heat. The thermal-mass is heavy and it is advantageous to not have to move such a heavy mass.

Nix (U.S. Pat. No. 8,127,759, issued Mar. 6, 2012) is titled 'Wedge Shape Solar Cooker'. The invention illustrates the use of a tiltable planar-reflector that also rotates to track the sun. The integration of both rotation and tilting allows for 4 degrees of freedom, thus permitting sunlight to be aimed at a target for use. The invented device uses a heliostat with a planar-reflector, allowing the parabolic-half-shell to remain in a fixed position, moving only the planar-reflector, or heliostat.

Nix (U.S. Pat. No. 5,113,845, issued May 19, 1992) illustrates the use of an overhang for a tabletop solar reflector. The overhang helps add additional reflection. The overhang helps protect the parabolic reflective surface from rainfall. The invented device uses a curved-overhang to protect the crucible from rainfall, and to add sunlight from sunrise or sunset.

Nix (U.S. Pat. No. 5,308,187, issued May 3, 1994) illustrates the use of a thermal-mass to store solar heat, and illustrates the use of a transparent-and-insulating floor to insulate and trap sunlight. The thermal-mass creates hot air, which can be used for combustion. A fan blows ambient air into aft embedded pipes to create hot air. The invented device uses a similar thermal-mass to trap stray rays, sunlight, that do not fall on the foci.

Nix (U.S. Pat. No. 5,488,801, issued Feb. 6, 1996) illustrates the use of a solar photovoltaic powered fan. Air is blown when solar energy, sunlight, is present, removing hot air and replacing with cool air. The invented device uses a fan, or blower, possibly solar power, to move air through embedded pipes in a thermal-mass heated by solar energy, sunlight.

Nix (U.S. patent application Ser. No. 11/623,312, Filed Dec. 5, 2006. Pub. No. 2008/0131830 Jun. 5, 2008) is titled 'Use of Renewable Energy Like Solar, Wind, Geothermal, Biomass, and Hydropower for Manufacturing Combustion Air for a Fossil Fuel Burner and Firebox'. Illustrated is the use of renewable energy to assist combustion by preheating combustion air. Hot air is created from embedded pipes in a thermal-mass. FIG. 9A and FIG. 9B illustrate a half-shell-parabolic floating on a turntable. The sun's energy, sunlight, focuses on a hot air oven to create combustion air.

The above art and science (Nix, Nix, Nix, Nix, Nix, Nix) show that the invented device is feasible, and integrates many of the features of the above prior art.

SUMMARY OF INVENTION

A curved dish type parabolic solar collector is cut in half and placed horizontal to the ground. The ground can be a thermal-mass surrounded by an insulating-foundation. Positioned near the open cavity created by the parabolic-half-shell and curved-overhang is a fully tracking planar-reflector, or heliostat. The parabolic-half-shell is curved to the 45 degree tangent. This planar-reflector, or heliostat rotates on a turntable, and tilts the planar-reflector, adjusted by an actuator. The actuator can be hydraulic or compressed air powered, an inflated air spring, or electrically or manually powered. The net result is the planar-reflector, or heliostat on the turntable makes sunlight horizontal and reflects sunlight off the parabolic-half-shell interior wall. The parabolic-half-shell focuses the sunlight onto a foci, located centrally and in the ground.

At the foci is a crucible, which can contain rock, sand, glass or metal for melting. Also, the sun's focused energy, sunlight, can process chemicals or process waste. By placing the crucible in the thermal-mass, or ground, not in the air as is common practice with other solar concentrators, it is safer and also helps trap heat.

Surrounding the crucible is a thermal-mass, or ground, insulated on the bottom and sides. This thermal-mass stores solar heat from the crucible. The surplus heat stored in the thermal-mass can then be used at night time or in the winter, or on a cloudy day. Thus providing useful energy 24 hours a day. The thermal-mass can also preheat rock, sand, glass or metal before melting. The thermal-mass is dark color for solar absorption from sunlight, and is made of a thermal conducting material, such as metal flake with a binder.

Inside the thermal-mass are embedded pipes. A blower, possibly solar powered, blows ambient air into the embedded pipes. The embedded pipes capture heat from the thermal-mass and make the air hot. Also the embedded pipes can heat a gas or fluid. This hot air can be useful for drying, space heat, or making water hot, or for combustion as for preheating air to a charcoal grill, or fossil fuel fire box.

Above, parallel, attached and adjacent, the thermal-mass is a transparent-and-insulating floor. This transparent-and-insulating floor captures any stray solar rays, sunlight, not captured by the crucible. This transparent-and-insulating floor is bounded by an insulating-foundation of the parabolic-half-shell and curved-overhang. The transparent-and-insulating floor could be tiled, or made of plate glass, transparent glass rock, salt, quartz or any suitable glazing. This allows the thermal-mass to capture the sun's energy, sunlight, from clouds or sunlight not used by the foci.

The transparent-and-insulating floor is also located underneath a curved-overhang. This curve-overhang is positioned attached and adjacent to the parabolic-half-shell. The interior of the curved-overhang is reflective so as to capture sunlight from the side, as from sunrise and sunset. Its major purpose is to keep rainfall off the crucible, and prevent the crucible from cooling from the rainwater. The curved sunlight from the curved-overhang, also helps to heat the crucible, and the surrounding thermal-mass.

The net result is a total energy system that not only melts materials, such as household waste, but also provides hot air, fluids or gases 24 hours to a building, residence, or even preheat combustion air to a charcoal grill or cooking oven. The invented device can be as small as a few feet or upwards to a 100 feet in diameter, creating a very powerful and ergonomic application of the sun's energy.

DETAILED DESCRIPTION

Figure 1:
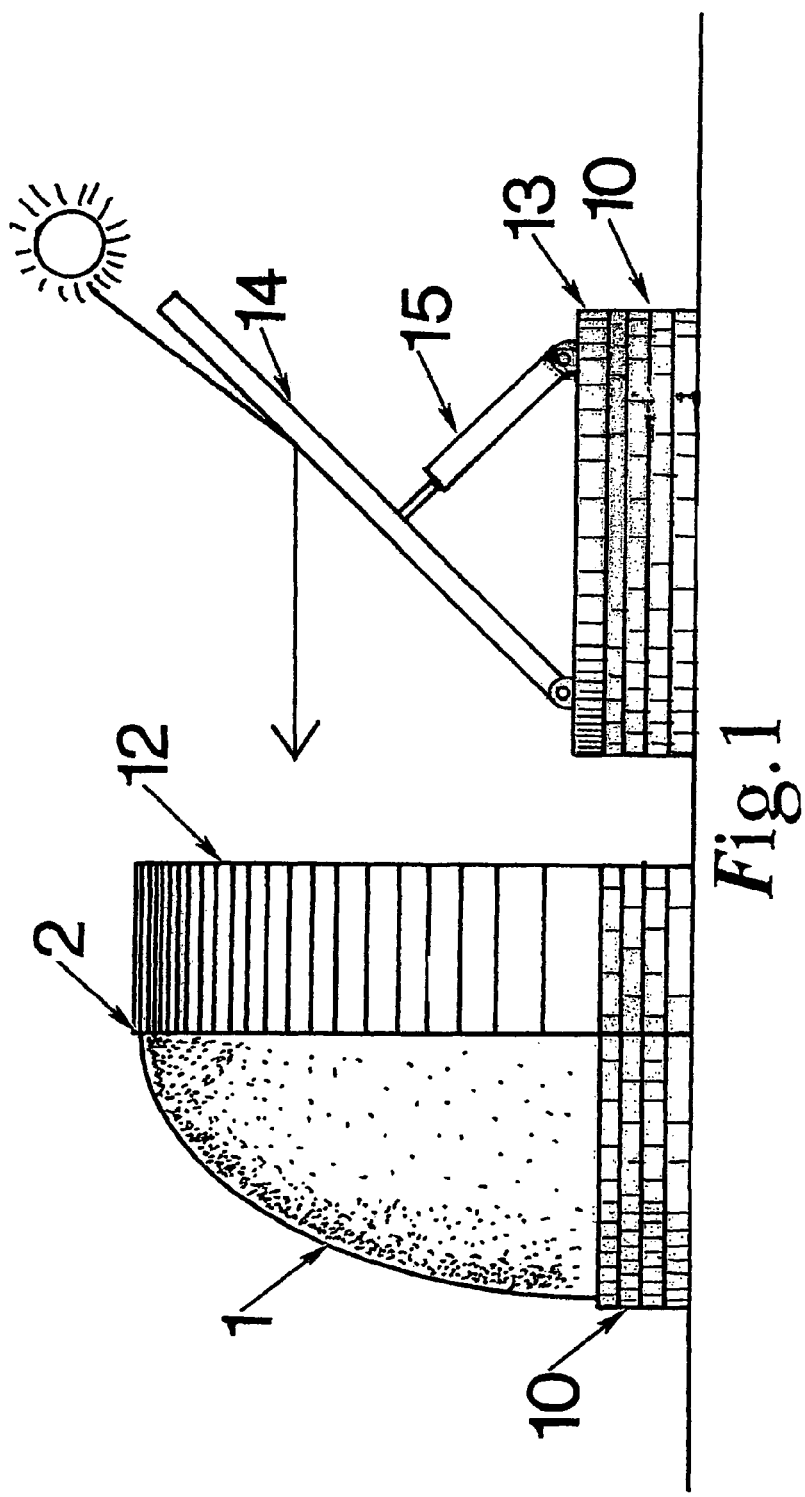
FIG. 1 illustrates a side view of the invented device. A parabolic-half-shell with a curved-overhang is on an insulating-foundation. Positioned separate and horizontal is a turntable with a tiltable heliostat, or a planar-reflector.
Figure 2:
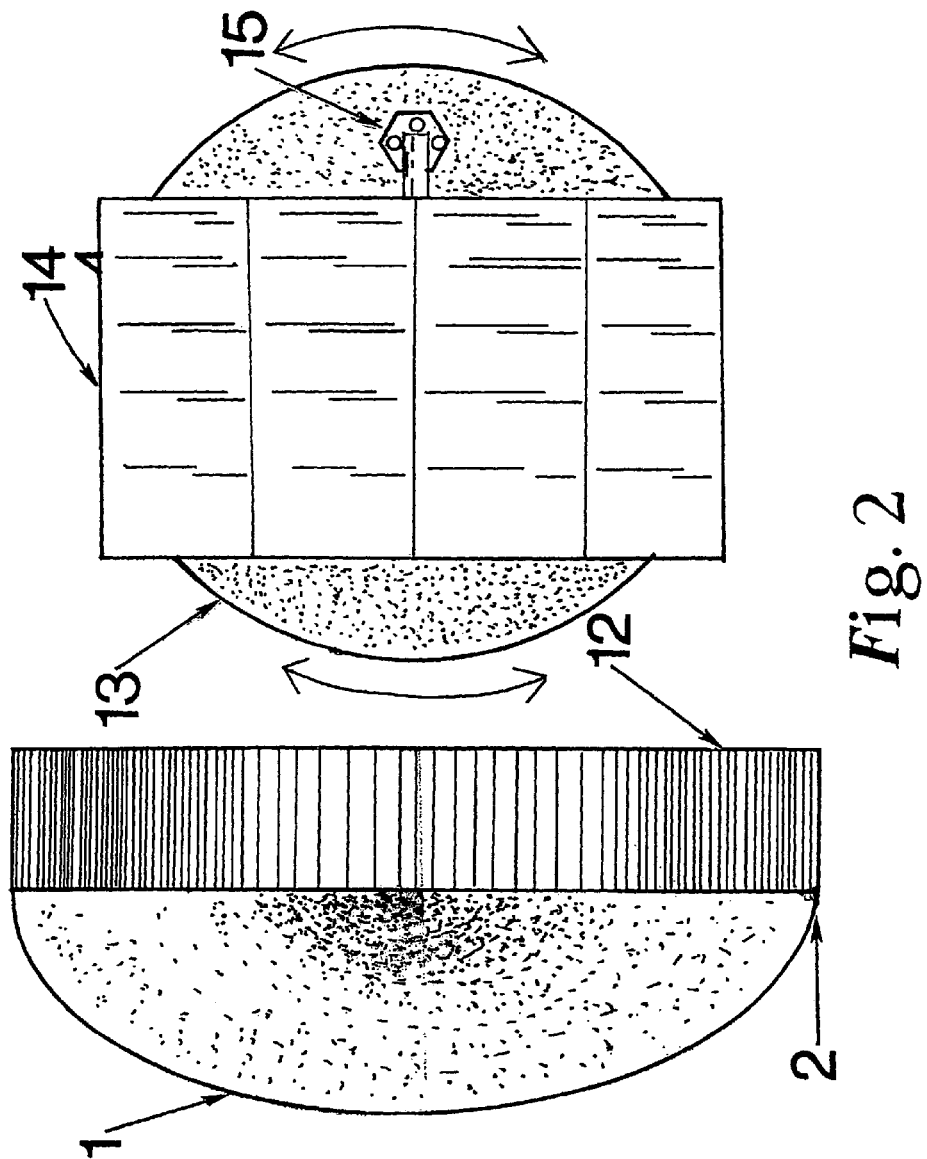
FIG. 2 illustrates an overhead view of the invented device. A parabolic-half-shell with a curved-overhang captures horizontal sunlight from a planar-reflector, or heliostat. The planar-reflector is tiltable and rotatable on a turntable.
Figure 3:
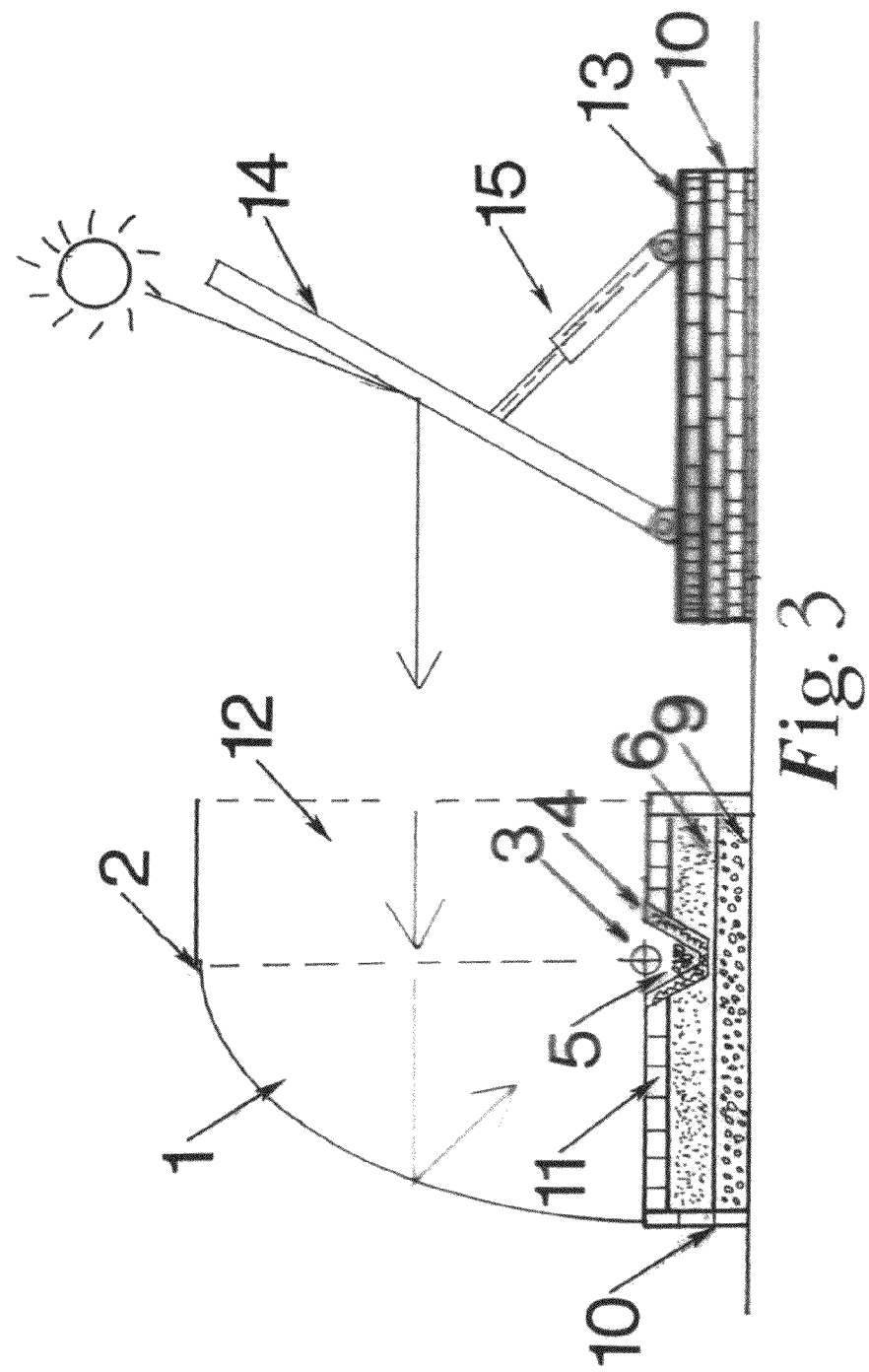
FIG. 3 illustrates a cross sectional view of the functionality of the invented device. A planar-reflector, or a heliostat mounted on a turntable reflects sunlight horizontally into the cavity formed by the parabolic-half-shell and curved-overhang. The interior walls of the parabolic-half-shell and the curved-overhang then focus the sunlight onto a foci or crucible. The crucible then melts rock, sand, glass or metal. Surrounding the crucible is a thermal-mass to capture and store solar heat from sunlight.
Figure 4:
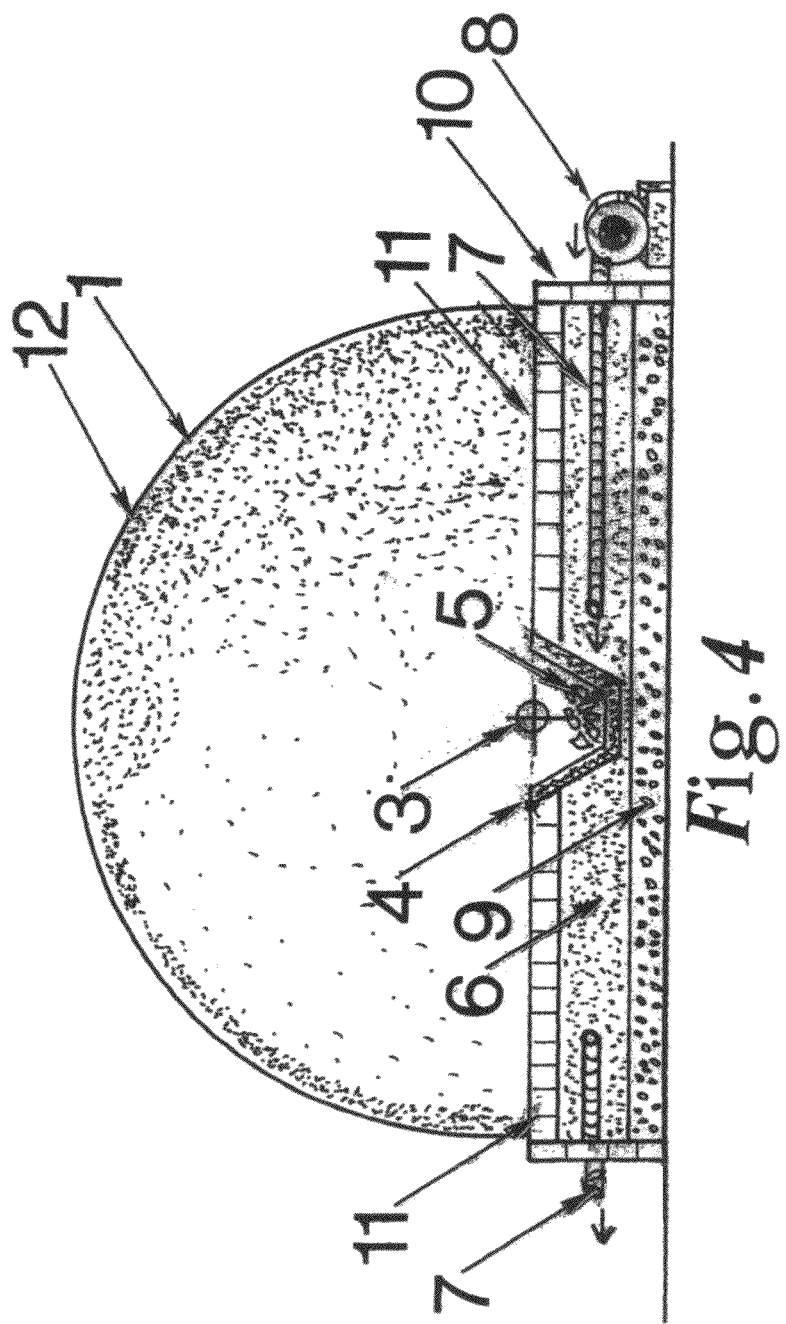
FIG. 4 illustrates a cross sectional frontal view of the functionality of the invented device. A parabolic-half-shell concentrates reflected sunlight unto a foci, or crucible for melting of rock, sand, glass or metal. Surrounding the crucible is a thermal-mass for storing solar heat. Above, parallel, adjacent and attached, and on top the thermal-mass is a transparent-and-insulating floor, which captures any solar rays, or sunlight from clouds, helping to keep the thermal-mass hot. Also shown is a curved-overhang, which captures any sunlight from the side, as from sunrise or sunset.
Figure 5:
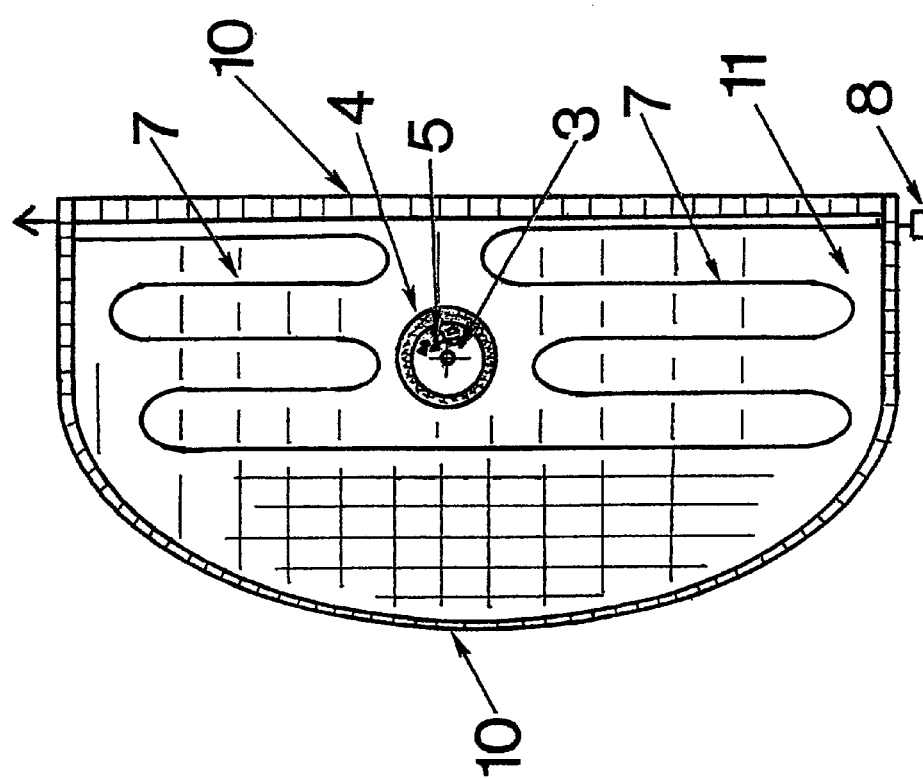
FIG. 5 illustrates an overhead cross sectional view of the functionality of the invented device. An insulating-foundation serves as mounting for the parabolic-half-shell, curved-overhang, and also as a boundary for the thermal-mass. Embedded in the thermal-mass is a crucible for melting rock, sand, glass or metal, and also coiled embedded pipes for heating of air, gas, or a fluid. The thermal-mass is topped, parallel, adjacent and attached, by a transparent-and-insulating floor to capture any stray solar rays, or sunlight from clouds.

FIGS. 1, 2, 3, 4 and 5 illustrate the embodiments of the invented device. The half-shell-parabolic (1) is reflective on the interior of sunlight. The half-shell-parabolic (1) is of the dish type, and extends to the 45 degree tangent (2). The parabolic-half-shell (1) can be made of cement, fiberglass, aluminum, plastic, or other materials like brick or structural composites. The reflective material can be aluminum, silver, gold or even reflective paint.

The parabolic-half-shell (1) reflects and concentrates sunlight at the foci (3), where also is a crucible (4). The concentrated sunlight can melt rock, sand, glass or metal, or also process chemicals and waste (5). Unlike other solar concentrators, the crucible (4) is safely in the thermal-mass (6), or ground where it can't spill. Also, by burying the crucible (4) in the thermal-mass (6), or ground, it helps to trap heat from sunlight better.

The crucible (4) is surrounded by a thermal-mass (6). The thermal-mass (6) traps any surplus solar heat from sunlight, and stores the heat from sunlight for night use, or winter use. The thermal-mass (6) also helps to preheat the rock, sand, glass or metal or chemical or waste (5) for solar melting. The thermal-mass (6) captures heat from the crucible (4), but also helps keep the crucible (4) hot.

The thermal-mass (6) also has embedded pipes (7) that convert a gas, air or fluid to be hot. A blower (8) or pump (8) compresses and moves a gas, air or fluid into the embedded pipes (7). The thermal-mass (6) thus can make gas, air or a fluid hot 24 hours a day, year round, even in cloudy or winter conditions. The thermal-mass (6) is dark color, for solar absorption, and is made of a thermally conductive material as metal flake with a binder.

Underneath the thermal-mass (6) is an insulating layer (9), perhaps made of fly ash and recycled Styrofoam, or other insulating materials. On the sides and boundary of the thermal-mass (6) is an insulating-foundation (10) for the reflecting parabolic-half-shell (1) and also for the curved-overhang (12). Above, parallel, adjacent, attached, and on top is a transparent-and-insulating floor (11). This transparent-and-insulating floor (11) traps any stray solar rays, or any sunlight from clouds, helping to keep the thermal-mass (6) hot. Thus, the thermal-mass (6) receive heat from two sources, the transparent-and-insulating floor (11), and the crucible (4). The transparent-and-insulating floor (11) can be clear glass tile, or be plate glass, glass rock, quartz sand, salt or any other transparent material.

Adjacent and attached to the parabolic-half-shell (1) is a curved-overhang (12). The curved-overhang (12) is attached at the 45 degree tangent of the parabolic-half-shell (1). This curved-overhang (12) is also reflective on the interior walls, and redirects sunlight from-the side, as from sunrise or sunset, towards the foci (3), crucible (4) and towards the thermal-mass (6). Thus both direct and indirect sunlight is captured. The curved-overhang (12) also helps to protect the crucible (4) from rainfall and snow. This helps to keep the crucible (4) hot, and prevents moisture from robbing the heat. The curved-overhang (12) also helps to keep moisture away from the thermal-mass (6) and the transparent-and-insulating floor (11).

Located near the open cavity created by the parabolic-half-shell and curved-overhang (1,12) is a turntable (13). Mounted on the turntable (13) is a planar-reflector (14) or heliostat (14). This planar-reflector (14) is tiltable via an actuator (15) which can be powered from hydraulics, compressed air, electricity, or be manually operated and so on. The actuator (15) could be a compressed air spring. The turntable (13) can be rotated via steel or rubber wheels, or floated on a layer of oil, water or compressed air. The turntable (13) and actuator (15) combination moves and position the planar-reflector (14) so as to redirect sunlight horizontal into the cavity formed by the parabolic-half-shell (1) and the curved-overhang (12). The reflection from the interior walls of the parabolic-half-shell (1) and the curved-overhang (12) combination and planar-reflector (14), or heliostat (14) focus the sun's rays, sunlight, onto a foci (3) and helps melt materials (5) in a crucible (4).

The net result is a solar collector (1,4,6,11,12,14,) that captures both direct solar energy (sunlight) and indirect sunlight (clouds) to usefully process materials and waste (5), and also to manufacture hot gas, air or fluids for a residential, or commercial buildings. The hot air for example can heat hot water, create space heat, or be blown into a firebox to be used for combustion air. Hot air for example could preheat air to a charcoal grill, thus conserving charcoal, and reducing smoke. The thermal-mass (6) stores heat, thus allowing energy to be used 24 hours a day, year round, even in the winter or on a cloudy day.

The invention claimed is:

1. A system comprising of: a reflective parabolic-half-shell; said reflective parabolic-half-shell curved to the 45 degree tangent; the reflective parabolic-half-shell mounted horizontal and perpendicular to an insulating-foundation; the reflective parabolic-half-shell focusing sunlight to a crucible mounted at the foci of the parabolic half-shell; said crucible melting rock, sand, glass or metal; the crucible processing chemicals or waste; the crucible surrounded by a thermal-mass on an underside thereof made of one of foam or fly ash; said thermal-mass storing solar produced heat from the crucible; the thermal-mass bounded by said insulating-foundation; the thermal-mass dark color for solar absorption, and made of a thermal conducting material; the thermal-mass with embedded pipes converting gas, air or fluids to be hot; said embedded pipes using a blower or fan or pump moving gas or air or fluids though the embedded pipes; a transparent-and-insulating floor capturing stray solar rays, or sunlight, from clouds keeping the thermal-mass hot;

said transparent-and-insulating floor located above, parallel, adjacent and attached, to the thermal-mass;

a reflective curved overhang having reflective interior walls positioned adjacent and attached to the reflective parabolic-half-shell;

said reflective curved-overhang positioned and attached to said 45 degree tangent;

the reflective curved-overhang positioned perpendicular and attached to the insulating-foundation;

the reflective curved-overhang protecting the crucible from rainfall, and reflecting sunlight from the side, as from sunrise and sunset, unto the crucible and thermal-mass;

a planar-reflector mounted on a rotating turntable, said turntable rotatable by one of wheels or a floating layer of oil;

said planar-reflector tiltable on top of said rotating turntable by an actuator comprising a compressed air spring;

the planar-reflector redirecting sunlight horizontally and into the cavity formed by the reflective parabolic-half-shell and curved overhang;

the planar-reflector reflecting sunlight onto said foci located at the crucible;

said system means to melt and heat rock, sand, glass or metal or process chemicals or waste or heat gas, air or fluids 24 hours a day year round.

\* \* \* \* \*